G. BLANKFIELD.
MEANS FOR PACKING AND LUBRICATING THE PISTONS OF INTERNAL COMBUSTION AND OTHER ENGINES.
APPLICATION FILED SEPT. 18, 1918.

1,336,342. Patented Apr. 6, 1920.

Witness:
Chas. Overdab

Inventor:
George Blankfield

UNITED STATES PATENT OFFICE.

GEORGE BLANKFIELD, OF BENONI, TRANSVAAL, SOUTH AFRICA, ASSIGNOR OF ONE-SIXTH TO ALFRED EDWARD REID, ONE-SIXTH TO ISRAEL KUPER, AND ONE-SIXTH TO PACA CECIL GORDON, ALL OF BENONI, TRANSVAAL, SOUTH AFRICA.

MEANS FOR PACKING AND LUBRICATING THE PISTONS OF INTERNAL-COMBUSTION AND OTHER ENGINES.

1,336,342.

Specification of Letters Patent.

Patented Apr. 6, 1920.

Application filed September 18, 1918. Serial No. 254,611.

*To all whom it may concern:*

Be it known that I, GEORGE BLANKFIELD, a subject of the King of Great Britain, and resident of Benoni, Transvaal Province, Union of South Africa, have invented certain new and useful Improvements in Means for Packing and Lubricating the Pistons of Internal-Combustion and other Engines, of which the following is a specification.

This invention relates primarily to means for packing the pistons of internal combustion engines, although it can be adopted for packing the pistons of ordinary reciprocating engines, locomotives, and the like.

The improved packing means can also be combined with or incorporate a means for lubricating the wall or bore of the cylinder in which the piston reciprocates.

The object of the invention is to provide a piston packing means which will eliminate or reduce to a minimum leakage past the piston, and consequently, by attaining a higher degree of compression of the explosive gaseous mixture in the cylinder, obtain a higher speed and increased efficiency of the engine.

To the attainment of the aforesaid object the present invention consists of means which are so designed as to insure contact between the piston packing and the cylinder wall or bore for practically the full length of the piston.

The invention will be fully explained with the aid of the accompanying drawings, wherein I illustrate the preferred form of the same.

Figure 1:
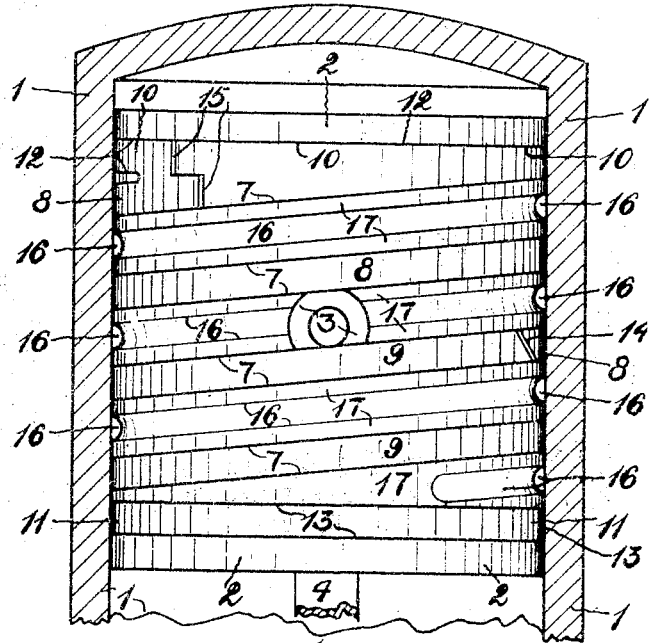
Figure 1 is a sectional elevation of portion of a cylinder of an internal combustion engine with the piston in position therein, the piston being provided with the improved packing and lubricating means.
Figure 2:
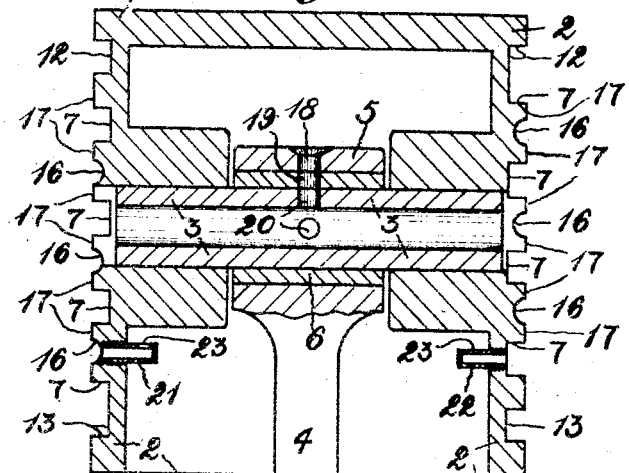
Fig. 2 is a sectional elevation of the piston removed from the cylinder, and showing the inner end of the connecting rod, its bush and the gudgeon pin in section.

In the drawings the numeral 1 denotes the cylinder, 2 the piston, 3 the gudgeon pin, and 4 the connecting rod. 5 is that end of the connecting rod which works on the gudgeon pin 3, and 6 is the bush which is placed between the end 5 of the connecting rod 4 and the gudgeon pin 3.

In accordance with this invention I form around the cylindrical exterior surface of the piston 2, a helical or spiral groove 7, and place in said groove a helical or spiral packing means or arrangement. As shown in the drawings the circumvolutions of said helical or spiral groove 7 wind around the piston 2 preferably for practically the full length of the piston, and the packing means or arrangement is preferably in the form of two helical or spiral pieces or members 8, 9, each of which is preferably combined with a split circular part or ring 10, 11, respectively. The split rings 10, 11, are positioned in circular grooves 12, 13, formed near the ends of the piston 2, and the spiral or helical portions 8, 9, lie in the correspondingly shaped groove 7, and wind or coil around the piston from each end in the direction of each other, or toward the center of the length of the piston 2. The ends of the coils 8, 9, may be beveled, as indicated at 14, so that when in position they will overlap to a greater or less extent.

Figure 3:
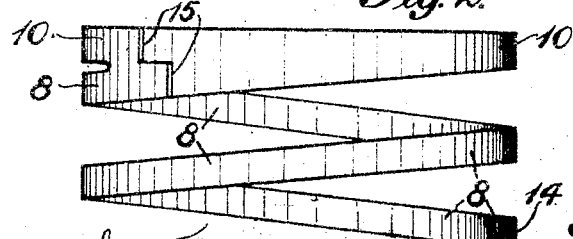
Fig. 3 is an elevation of one of the packing devices detached.

The split 15, in each of the circular parts or rings 10, 11, which, as shown, is preferably stepped so that the ends overlap when the rings are around the piston and compressed within the cylinder—see Figs. 1 and 3—is preferably formed in the wider part, or near to the point where the helical or spiral part commences to join or merge into it. In this way adequate width and strength is afforded in the metal to allow of the split 15 being stepped.

The helical or spiral packing pieces 8, 9, may pass over, and either partially or completely cover, the ends of the gudgeon pin 3, and by that means operate to prevent the grooving or cutting of the cylinder wall or bore by said pin.

The lubricating means consists in forming one (as shown) or more helical or spiral grooves or channels 16 in the helical or spiral thread or projection 17 which is formed around the piston by the main helical or spiral groove 7. In the end 5 of the connecting rod 4, and in the bush 6, coincident holes or apertures 18, 19, are formed, which allow the lubricating oil to pass to the surface of the gudgeon pin 3, and one or more holes or apertures 20 in said pin 3 allow the oil to pass into the interior of the pin 3. The lubricant is able to pass out of the ends of the pin 3 into the helical or spiral lubricating grooves or channels 16 around the piston 2, and so insures a thorough distribution of the same during practically the entire stroke of the piston 2 in the cylinder 1.

If desired the above described lubricating means may be supplemented by providing two tubes 21, 22, and screwing or otherwise fixing the same in the inside of the piston in such a position that their open ends communicate with the lubricating groove or channel 16 or helical or spiral groove 7. The other ends of the tubes 21, 22, are closed, and a hole 23 is formed in the side of each tube to permit the lubricating oil to pass into the tubes and thence direct to the groove or channel 16 or helical or spiral groove 7.

As will be readily understood the improved piston packing means insures contact between the helical or spiral pieces or members 8, 9, and the wall or bore of the cylinder 1, for practically the full length of the piston 2. This results in greater compression of the explosive gaseous mixture in the cylinder, as leakage past the piston is prevented or minimized, and in this way an increased speed and higher efficiency of the engine is obtained. The contact between the packing means and the cylinder wall or bore for practically the full length of the piston, by preventing rocking of the piston, also results in even wear of both cylinder and piston with its many advantages.

What I claim as my invention, and desire to protect by Letters Patent is:—

1. In combination, an engine cylinder, a piston in said cylinder, said piston having a circular groove near each end and a helical groove joining said circular end grooves, a packing means in said circular and helical grooves, said means comprising a pair of rings each connected to a helical part.

2. In combination, an engine cylinder, a piston in said cylinder, said piston having a circular groove near each end and a continuous helical groove joining said circular end grooves, a packing means in said circular and helical grooves, said means consisting of two split circular parts or rings each having a helical member, which helical members coil around the piston from the rings at opposite ends toward each other.

3. In combination, an engine cylinder, a piston in said cylinder, said piston having a combined helical and circular groove, a packing device arranged in said helical and circular groove, said device comprising a split circular part or ring and an attached helical portion.

4. In combination, an engine cylinder, a piston in said cylinder, said piston having a combined helical and circular groove, a packing device arranged in said helical and circular groove, said device comprising a split circular part or ring and an attached helical portion, the split formed in the circular part or ring being stepped.

5. In combination, an engine cylinder, a piston in said cylinder, said piston having a combined helical and circular groove, a packing device arranged in said helical and circular groove, said device comprising a split circular part or ring and an attached helical portion, the split formed in the circular part or ring being stepped, the step being formed in the wider part of the circular part or ring or near to the point where the said helical part commences to join or merge into the said circular part or ring.

6. In combination, an engine cylinder, a piston in said cylinder, said piston having a circular groove formed near each end and a helical groove which winds around the piston for practically the full length of the piston, and joins or merges at its ends into the said circular end grooves, a packing means arranged in said helical and circular grooves, said means consisting of two split circular parts or rings each having attached to it a helical portion, the adjacent ends of the helical portions being beveled so that the said ends overlap each other when the packing means are in position around the piston.

7. In combination, an engine cylinder, a piston in said cylinder, said piston having an external helical groove, and a helical packing device in said groove, the helical thread or projection which is formed on the cylinder by the helical groove having a helical lubricating groove or channel.

8. In combination, an engine cylinder, a piston in said cylinder, said piston having an external helical groove and a helical packing device in said groove, the helical thread or projection, which is formed on the cylinder by the helical groove, having a helical lubricating groove or channel, and means which permit the lubricant to pass from the interior of the piston to the aforesaid lubricating groove or channel.

9. In combination, an engine cylinder, a piston in said cylinder, said piston having an external helical groove and a helical packing device in said groove, the helical thread or projection which is formed on the cylinder by the helical groove having a helical lubricating groove or channel, a connecting rod attached to the piston, and a gudgeon pin for attaching the connecting rod to the piston, said connecting rod and gudgeon pin having passages formed therein which permit the lubricant to pass from the interior of the piston to the helical groove or channel.

10. In combination, an engine cylinder, a piston in said cylinder, said piston having an external helical groove and a helical packing device in said groove, the helical thread or projection which is formed on the cylinder by the helical groove having a helical lubricating groove or channel, and means which permit the lubricant to pass from the interior of the piston to the aforesaid lubricating groove or channel, said means comprising a tube fixed to the piston and provided with an opening leading to the exterior of the piston and with an inlet for the lubricant communicating with the interior of the piston.

In testimony whereof I have signed my name to this specification in the presence of two subscribing witnesses.

GEORGE BLANKFIELD.

Witnesses:
  CHAS. OVENDALE,
  L. SHAIFE.